Oct. 30, 1923.

H. VANDERBEEK

VEHICLE BRAKE

Filed Nov. 8, 1922

1,472,444

INVENTOR
Herbert Vanderbeek,
by his ATTORNEYS.

Patented Oct. 30, 1923.

1,472,444

UNITED STATES PATENT OFFICE.

HERBERT VANDERBEEK, OF DETROIT, MICHIGAN, ASSIGNOR TO THE TIMKEN-DETROIT AXLE COMPANY, OF DETROIT, MICHIGAN, A CORPORATION OF MICHIGAN.

VEHICLE BRAKE.

Application filed November 8, 1922. Serial No. 599,657.

*To all whom it may concern:*

Be it known that I, HERBERT VANDERBEEK, a citizen of the United States, and a resident of the city of Detroit, in the county of Wayne and State of Michigan, have invented a new and useful Improvement in Vehicle Brakes, of which the following is a specification.

This invention relates to internal band brakes of the toggle operated type particularly adapted for use in connection with the wheels of motor vehicles.

One of the principal objects of the present invention is to utilize the forces arising from the initial engagement between the braking surfaces to increase the friction developed therebetween, thereby reducing the power required to apply the brake. Other objects are simplicity of construction, reduced cost of manufacture and compactness of design.

The invention consists principally in the novel arrangement of toggle adapted to be assisted in its operation by the tendency of the brake band to rotate with the brake drum. The invention further consists in the parts and in the combinations and arrangements of parts hereinafter described and claimed.

Figure 1:
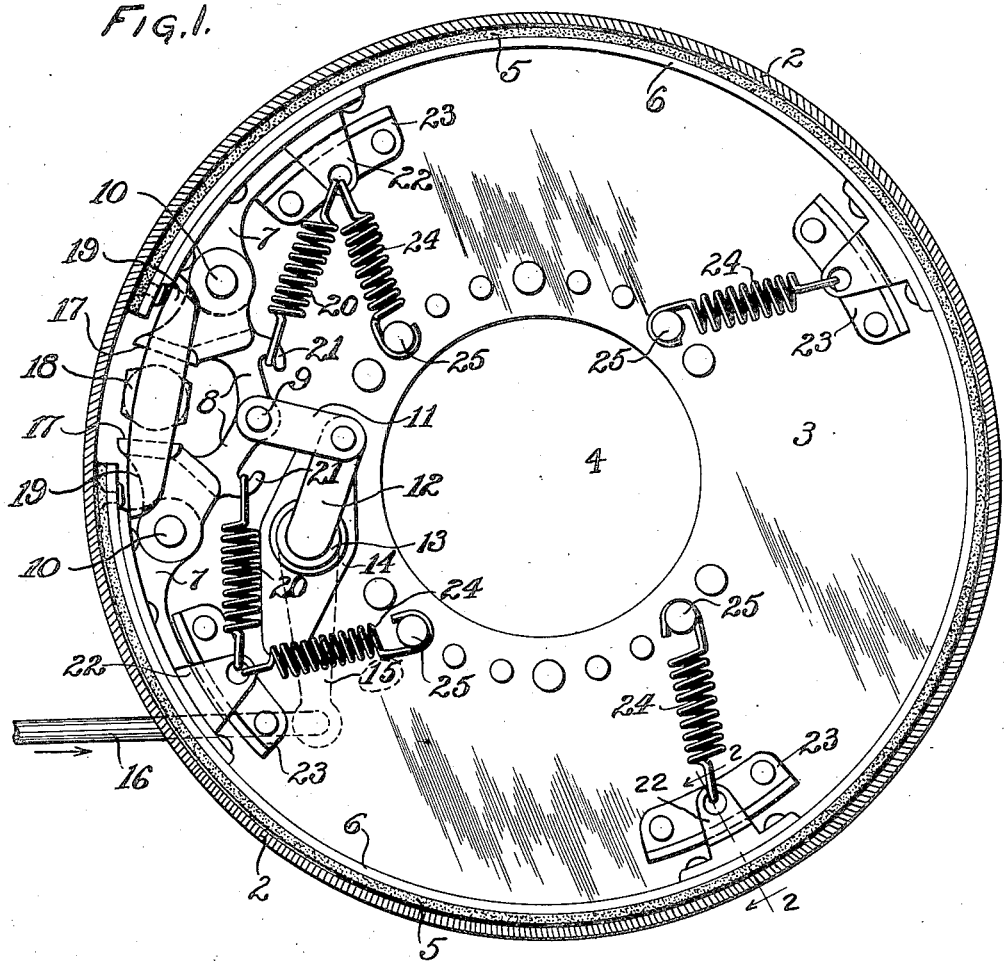
Figure 2:
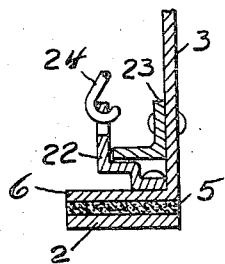

In the accompanying drawing, which forms part of this specification and wherein like reference numerals refer to like parts wherever they occur, Fig. 1 is a sectional view illustrating a brake drum provided with a toggle operated band brake embodying my invention; Fig. 2 is a detail section view on line 2—2 of Fig. 1.

For purposes of illustration, my invention is shown in connection with the circular brake flange 2 of a brake drum adapted to be fixed to and rotated with the driving wheel (not shown) of an automobile and is provided with a central circular axle-receiving opening 4. This construction is well known and it is considered unnecessary to illustrate it in detail.

The inner surface of the brake flange 2 is adapted to be frictionally engaged by the brake lining material 5 of a split semi-flexible metallic brake band 6. The adjacent end portions of the brake band are each provided with an end fitting 7; and the said end fittings are loosely connected by means of an elbow or toggle joint comprising a pair of links 8, whose adjacent ends are pivotally connected by means of a pivot pin 9 and whose outer ends are pivotally connected by means of pivot pins 10 to the respective end fittings. The toggle links are disposed with their point of junction offset inwardly toward the center of the brake drum with respect to their points of connection with the brake band. An actuating link 11 has a pivotal connection at one end with the toggle links 8 at their point of junction; and, in accordance with common practice, the opposite end of said actuating link is pivotally secured to the free end of a rock arm 12 which is fixed to a rock shaft 13 journaled in a bracket 14 riveted or otherwise rigidly secured to a stationary brake disk or shield 3. The rock shaft 13 is also provided with the usual actuating arm 15 adapted to be connected to the brake pedal (not shown) by means of the usual pull rod 16.

The toggle links 8 are provided, at points offset outwardly from their points of connection with the ends of the brake band, with oppositely disposed flanges 17 adapted to abut against an anchor stud 18 arranged therebetween which is rigidly secured to the stationary brake disk or shield 3. The abutment stud 18 is provided with oppositely extending arms 19 that project across the ends of the abutment flanges 17 of the toggle links 8 and serve to prevent sliding movement of said links on their supporting pivots 10. The toggle is normally held in open position by means of a pair of coil springs 20. One end of a spring is secured to a hook 21 formed integral with a toggle link 8, and the other end of said spring is secured to a lug or ear 22 on the end fitting 7 to which said toggle link is pivotally secured, thereby tending to hold the toggle normally in its bent position and the ends of the brake band clear of the drum.

At points intermediate its ends, the brake band is held out of contact with the brake drum and against a plurality of stop brackets 23 by means of a plurality of coil springs 24. These stop brackets are of angle section and have one flange rigidly secured to the stationary brake disk 3. The other flanges of the stop brackets are shaped to conform to the curvature of the brake band which, in its contracted position is held against said curved flanges by the springs 24. The inner ends of the springs 24 are hooked around a series of circumferentially spaced pins 25 that are secured to the stationary brake disk 3 adjacent to the central axle receiving opening 4 therein. The outer ends of the springs that are located adjacent to the end fittings of the brake band are hooked into the ears or lugs 22 of said end fittings; and the outer ends of the springs located adjacent to the middle of the brake band are hooked into holes formed in the inwardly projecting lugs or ears of brackets 25 that are riveted or otherwise rigidly secured to the brake band. These springs 24, together with the springs 20, serve to hold the brake band normally clear of the rotating brake drum.

Assuming the parts to be in the positions indicated in the drawing, the operation of the device is as follows:

The operator in applying the brake causes the pull rod 16 to move in the direction of the arrow, thereby swinging the rock lever 12 in a direction that will cause the toggle actuating link 11 to move outwardly. This outward movement of the toggle actuating link causes the elbow of the toggle to move outwardly away from the center of the brake drum, which action tends to straighten the toggle, thereby spreading apart the ends of the brake band and forcing the same into engagement with the inner periphery of the brake drum. When the brake band is pressed against the rotating brake drum, the entire brake band, by reason of its frictional engagement with the brake drum, will rotate with said drum until the abutment flange 17 of one of the toggle links 8 strikes the fixed abutment stud 18. The action of forcing the toggle link against the abutment stud 18 at a point offset outwardly from the center of the link supporting pivot 9 causes said toggle lever to swing on said pivot in a direction which tends to further straighten the toggle, thereby reducing the power required to apply the brake. When the brake is released, the springs 20 break the toggle and draw the ends of the brake band away from the drum, the intermediate portion of the band being drawn away from the drum and against the stop brackets by the springs 24.

The hereinbefore described arrangement admits of considerable modification without departing from the invention; therefore, I do not wish to be limited to the precise arrangement shown and described.

What I claim is:

1. A brake drum, a split brake band adapted to frictionally engage said drum, a toggle joint operatively connected to the ends of said band for moving the same into and out of engagement with said drum, and a stationary abutment adapted in the engaged position of said band to be engaged by portions of said toggle that are located closer to the drum than the elbow of said toggle and its points of connection with said band.

2. A brake drum, a split brake band adapted to frictionally engage said drum, a toggle joint operatively connected to the ends of said band for moving the same into and out of engagement with said drum, a stationary abutment adapted in the engaged position of said band to be engaged by portions of said toggle that are located closer to the drum than the elbow of said toggle and its points of connection with said band, and yieldable means for normally holding said toggle clear of said abutment.

3. A brake drum, a split brake band adapted to frictionally engage said drum, a toggle joint operatively connected to the ends of said band for moving the same into and out of engagement with said drum, a stationary abutment adapted in the engaged position of said band to be engaged by portions of said toggle that are located closer to the drum than the elbow of said toggle and its points of connection with said band, and yieldable means for normally maintaining said toggle in an inoperative position and out of contact with said abutment.

4. A brake drum, a split brake band adapted to frictionally engage said drum, a toggle joint operatively connected to the ends of said band for moving the same into and out of engagement with said drum, a stationary abutment adapted in the engaged position of said band to be engaged by portions of said toggle that are located closer to the drum than the elbow of said toggle and its points of connection with said band, and yieldable means connecting said toggle with the ends of said band for normally maintaining the toggle in an inoperative position and out of contact with said abutment.

5. A brake drum, an internal brake band adapted to frictionally engage said drum, a toggle joint operatively connected to the ends of said band, said toggle joint being disposed with its elbow offset inwardly from its points of connection with said band, and a fixed abutment adapted to be engaged by said toggle joint at points offset outwardly from its points of connection with said band.

6. A brake drum, an internal brake band adapted to frictionally engage said drum, a toggle joint operatively connected to the ends of said band, said toggle joint being disposed with its elbow offset inwardly from its points of connection with said band, a fixed abutment adapted to be engaged by said toggle joint at points offset outwardly from its points of connection with said band, and yieldable means for normally maintaining said toggle in an inoperative position and out of contact with said abutment.

7. A brake drum, a circumferentially expansible split brake band adapted when expanded to frictionally engage the inner surface of said drum, a toggle joint for expanding and contracting said band, said toggle joint comprising a pair of links pivotally secured together and having their ends pivotally secured to the ends of said band, said toggle links being disposed with their point of junction offset inwardly from their points of connection with said band, and a stationary abutment adapted in the expanded position of said band to be engaged by a link of said toggle at a point offset outwardly from the point of connection of said link with said band.

8. A brake drum, a circumferentially expansible split brake band adapted when expanded to frictionally engage the inner surface of said drum, a toggle joint for expanding and contracting said band, said toggle joint comprising a pair of links pivotally secured to the ends of said band, said toggle links being disposed with their point of junction offset inwardly from their points of connection with said band, a stationary abutment adapted in the expanded position of said band to be engaged by a link of said toggle at a point offset outwardly from the point of connection of said link with said band, and yieldable means for normally holding said links clear of said abutment.

9. A brake drum, a circumferentially expansible split brake band adapted when expanded to frictionally engage the inner surface of said drum, a toggle joint for expanding and contracting said band, said toggle joint comprising a pair of links pivotally secured together and having their ends pivotally secured to the ends of said band, said toggle links being disposed with their point of junction offset inwardly from their points of connection with said band, a stationary abutment adapted in the expanded position of said band to be engaged by a link of said toggle at a point offset outwardly from the point of connection of said link with said band, and yieldable means connecting the toggle links with the free end portions of said band for normally maintaining said toggle in an inoperative position and out of contact with said abutment.

10. A brake drum, a circumferentially expansible split brake band adapted when expanded to engage the inner surface of said drum, and a toggle joint for expanding and contracting said band, said toggle comprising a pair of links pivotally secured together and having their ends pivotally secured to the ends of said brake band at points offset inwardly from their point of connection with said band, said links being formed at points offset outwardly from their points of connection with said band with oppositely disposed abutment flanges, and a stationary abutment disposed between said abutment flanges and adapted in the expanded position of said band to be engaged by an abutment flange of said toggle.

11. A brake drum, a circumferentially expansible split brake band adapted when expanded to engage the inner surface of said drum, and a toggle joint for expanding and contracting said band, said toggle comprising a pair of links pivotally secured together and having their ends pivotally secured to the ends of said brake band at points offset inwardly from their point of connection with said band, said links being formed at points offset outwardly from their points of connection with said band with oppositely disposed abutment flanges, a stationary abutment disposed between said abutment flanges and adapted in the expanded position of said band to be engaged by an abutment flange of said toggle, and yieldable means for normally holding the abutment flanges of said toggle clear of said stationary abutment.

12. A brake drum, a circumferentially expansible split brake band adapted when expanded to engage the inner surface of said drum, and a toggle joint for expanding and contracting said band, said toggle comprising a pair of links pivotally secured together and having their ends pivotally secured to the ends of said brake band at points offset inwardly from their point of connection with said band, said links being formed at points offset outwardly from their points of connection with said band with oppositely disposed abutment flanges, a stationary abutment disposed between said abutment flanges and adapted in the expanded position of said band to be engaged by an abutment flange of said toggle, and yieldable means for normally maintaining said toggle in an inoperative position with the abutment flange thereof out of contact with said stationary abutment.

13. A brake drum, an internal brake band adapted to frictionally engage said drum, a toggle joint operatively connected to the ends of said band, said toggle joint being disposed with its elbow offset inwardly from its points of connection with said band, a fixed abutment adapted to be engaged by said toggle joint at points offset outwardly from its points of connection with said band, and yieldable means for normally holding said toggle clear of said abutment.

Signed at Detroit, Michigan, this 4th day of November, 1922.

HERBERT VANDERBEEK.